United States Patent
Carson

[11] 3,732,081
[45] May 8, 1973

[54] APPARATUS FOR FLUID-SOLID CONTACTING OPERATIONS

[75] Inventor: Don B. Carson, Mount Prospect, Ill.

[73] Assignee: Universal Oil Products Company, Des Plaines, Ill.

[*] Notice: The portion of the term of this patent subsequent to Sept. 21, 1988, has been disclaimed

[22] Filed: May 20, 1971

[21] Appl. No.: 145,352

Related U.S. Application Data

[63] Continuation-in-part of Ser. No. 27,784, April 13, 1970, Pat. No. 3,607,129.

[52] U.S. Cl. ............23/288 S, 208/161, 208/155, 208/164, 55/345, 55/349, 55/474
[51] Int. Cl. ............................................B01j 9/20
[58] Field of Search ..............23/288 S; 208/161, 208/155, 164; 55/345, 349, 474

[56] References Cited

UNITED STATES PATENTS 2,718,491  9/1955  Green.....................23/288 S X
2,543,884  3/1951  Weikart.....................23/288 S
3,607,129  9/1971  Carson......................23/288 S Primary Examiner—James H. Tayman, Jr.
Attorney—James R. Hoatson, Jr. and Robert W. Erickson

[57] ABSTRACT

An apparatus comprising a riser reaction zone and a reaction zone vessel, said vessel having disposed therein a first and second particle separation means, the second particle separation means is connected to said riser reaction zone which passes into said vessel through its lowermost portion. The first particle separation means is connected to an outlet stream passing out of the reaction zone vessel. The apparatus is applicable for use in catalytic cracking operations, fluidized dehydrogenation operations, or any fluid-solid catalytic operation in which fluidized catalysts are utilized to effectuate a reaction. In a particular instances the apparatus may be used to perform a riser reaction and a dense fluidized bed contacting simultaneously.

8 Claims, 1 Drawing Figure

PATENTED MAY 8 1973
3,732,081
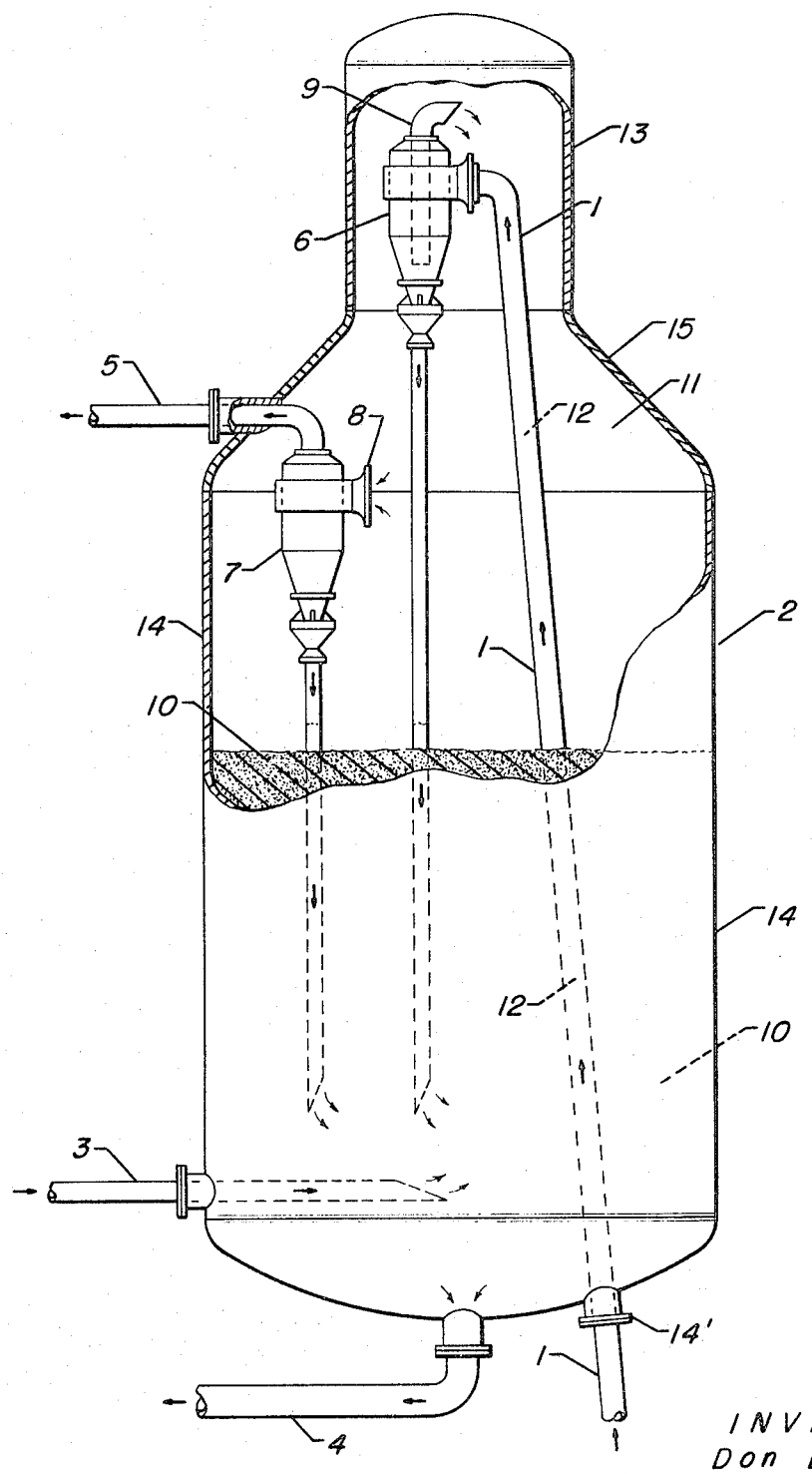
INVENTOR:
Don B. Carson
BY: James R. Hoatson, Jr.
Robert W. Erickson
ATTORNEYS

APPARATUS FOR FLUID-SOLID CONTACTING OPERATIONS

CROSS-REFERENCE TO RELATED APPLICATIONS

This application is a continuation-in-part application of the Inventor's copending application Ser. No. 27,784, filed on Apr. 13, 1970 now U.S. Pat. No. 3,607,129. All teachings of said copending application are incorporated into this specification by specific reference thereto.

BACKGROUND OF THE INVENTION

1. Field of the Invention

This invention pertains to the field of art characterized as fluid-solid contacting apparatus. More particularly this invention pertains to an apparatus for fluidized contacting of solids and vapors utilizing a riser type contacting zone and a dense bed contacting zone. At least a portion of the riser type reaction zone is located within the dense bed contacting zone.

2. Description of the Prior Art

It has been known for many years that heavy charge stocks such as gas oil, vacuum gas oil, coker gas oil, etc., may be cracked in the presence of a cracking catalyst to produce light hydrocarbons which are rich in olefins and high octane gasoline. In addition, most catalytic crackers are operated at conditions such that heavy product oil is obtained from the reaction zone. The reaction zone product is introduced into a fractionator which separates the products into light hydrocarbons, gasoline, light cycle oil and heavy cycle oil fractions. Typically, the heavy cycle oils are recycled to the cracking reaction zone along with the fresh feed which is passed thereto and are re-cracked to light hydrocarbon and gasoline products. The light cycle oil products recovered from the cracked products fractionator may be hydrogenated and recycled to the cracking reaction zone. It has been found that catalytic cracking of a hydrotreated light cycle oil, or in some instances a nonhydrotreated light cycle oil or heavy cycle oil over catalyst which has been partially deactivated results in enhanced cracking to desired products in contrast with the products obtained when the light cycle oil is directly contacted with a freshly regenerated catalyst. Although it is not exactly understood, it is believed that the freshly regenerated catalyst contains a number of highly acidic sites which are pacified when the feed stock and the heavy cycle oil are cracked over the freshly regenerated catalyst. In order to take advantage of this phenomenon, the present apparatus is disclosed.

Present day processes for catalytically cracking fresh feed stocks, in which the highly active crystalline aluminosilicates are employed, are tending to require shorter and shorter contact times between freshly regenerated catalyst and the fresh feed stock; the main reason being the reduction in light ends production accompanying the short catalyst-oil contact times. This generally requires that riser type cracking be effected. The light cycle oils are considered, after hydrogenation, to be readily crackable by catalyst which generally is required to be partially deactivated.

The partially deactivated catalyst is produced after the fresh feed and freshly regenerated cracking catalyst have been in contact for a time sufficient for cracking reactions to take place. Since the partially deactivated catalyst is slightly less active than the freshly regenerated catalyst, in most instances the light recycle oil or in some cases heavy cycle oil which contacts the partially deactivated catalyst can do so in a dense bed reaction zone in which longer catalyst-oil contact times exist. The longer contact times can be tolerated without excess cracking of the recycle oil to low quality dry gas materials.

The present invention allows the refiner to take advantage of the highly active catalyst presently being used by offering an apparatus which allows riser type cracking to take place with the separation of effluent material from the riser cracker as quickly as possible, in a cyclone separation zone. This reduces the catalyst oil contact times in the riser reactor system. The partially deactivated catalyst separated from the riser reaction zone effluent can then contact a recycle stream of light or heavy cycle oils in a fluidized dense bed contacting zone. The effluent materials from both the riser type reaction zone and the fluidized dense bed contacting zone are commingled and withdrawn through a common cyclone separation zone which generally is of higher efficiency than the cyclone separation zone used to separate the riser type reaction zone effluent.

The present apparatus allows the refiner to design a smaller dense phase contacting zone because only the recycle portion of the total feed material passing into the process may pass into that zone for reaction with the dense phase fluidized catalyst located therein. Also, the apparatus disclosed herein allows a reduction in contact time between oil and fresh catalyst in the riser type reaction zone because the particle separation means located at the upper end of said riser reaction zone quickly separates catalyst and oil which are leaving that reaction zone. This reduces hydrogen transfer between the cracked products and the partially deactivated catalyst. The smaller cross sectional area of the upper portion of the reaction vessel in which the second particle separation means is located reduces the residence time of the riser reaction zone hydrocarbon effluent in the reaction zone vessel, thereby preventing overcracking of that material to less valuable reaction products.

SUMMARY OF THE INVENTION

The claimed invention can be briefly summarized as an apparatus to allow fluidized contacting of a solid and fluid. More specifically, the claimed invention can be summarized as a riser type fluidized contacting zone and a dense bed contacting zone vessel which are interconnected in a manner in which the riser passes through the dense bed in the vessel and enters the vessel at a lower portion thereof. Cyclone separation zones are utilized to separate the effluent materials from the riser reaction zone and from the dense bed contacting zone located within the vessel.

In terms of utility the present invention can be utilized in the petroleum or petrochemical industries to effect various reactions including fluidized catalytic cracking of petroleum or the fluidized catalytic dehydrogenation of saturates.

BRIEF DESCRIPTION OF THE DRAWING AND PREFERRED EMBODIMENTS

The claimed apparatus is depicted in the attached drawing. The drawing shows a dense bed contacting vessel 2 and a vertically disposed reaction vessel 1 which passes into vessel 2 at a lower portion of vessel 2.

Dense bed contacting vessel 2 can be of any general shape, preferably a cylindrical and elongated vessel although other shaped vessels may be used. The requirement of a reduced cross-sectional area at the uppermost portion of vessel 2 must be met to reduce the residence time in vessel 2 of hydrocarbon material flowing from the riser reaction zone 1 via its cyclone separator 6 to cyclone separator 7. The contacting vessel 2 contains outlet 5 at a point which is higher than inlet 3 at the lower portion of vessel 2. This allows the effluent from the dense bed 10 of fluidized catalyst in vessel 2 to be withdrawn from the vessel. Vessel 2 contains outlet 4 at its lowermost portion through which deactivated catalyst is withdrawn and passed into a regeneration zone. The catalyst is contacted with oxygen containing stream at high temperatures in the regeneration zone to allow combustion to take place to remove coke from the spent catalyst. The regenerated catalyst can be contacted with feed stock and passed into riser reaction zone 1 at its lowermost portion to effect reaction of feed with freshly regenerated catalyst. Freshly regenerated catalyst can also be in admixture with hydrocarbons passing into vessel 2 via inlet line 3. Inlet line 3 can be connected to a riser type reaction zone which allows freshly regenerated catalyst to contact a feed material in this riser before passage into the dense bed 10 within vessel 2.

In other instances inlet line 3 may function as a stripping inlet stream through which a stream composed of an inert fluid such as nitrogen or steam can pass into dense bed 10 to effect stripping of adsorbed hydrocarbons from the catalyst in the dense bed prior to passage of the catalyst to the regenerator. In such cases, the inlet line 3 would be connected to a sparger or other fluid dispersing means to allow even distribution of the stripping stream throughout the dense bed 10. The lower portion of vessel 2 might be designed in a manner to allow efficient stripping operations to occur.

In instances in which inlet 3 is used to pass oil and/or catalyst into dense bed 10 the catalyst passing into the regenerator via line 4 may be stripped by a stripping stream passing into line 4.

A portion of riser reaction zone 1 is located within vessel 2 and is connected to a particle separation means which is located at an upper portion 13 of the vessel. The upper section 13 has a relatively small inside cross-sectional area as compared to the portion of vessel (section 14) where separation means 7 is located. The portion of riser 1 is located within vessel 2 should be vertical to prevent the fluidized mixture passing therethrough from having to pass through complicated curbed portions which could cause temporary disruptions in fluidized operations. The term "substantially vertical" as used in this specification and the attached claims shall mean a minimum of deviation from the vertical axis to accomplish the aforesaid goal. In some case at least one sharp curve is needed to allow a substantially vertical riser to pass horizontally into a separation means as shown in the drawing.

The relatively wider portion of the reaction vessel 2 where separation means 7 is located is essential to this apparatus in order to allow the superficial velocity of materials passing through the dense bed 10 located within vessel 2 to be at a sufficiently low value to minimize catalyst entrainment from the dense phase fluidized bed of catalyst 10. The larger the diameter of vessel 2 at section 14, the greater the amount of fluid material that can be fed through catalyst bed 10 before catalyst entrainment occurs.

Effluent from riser 1 flows into separation means 6 which separates hydrocarbons from catalyst. The hydrocarbons pass out of separation means 6 via outlet 9 and into separation means 7 via inlet 8 which is also located within vessel 2. In order to reduce the residence time in vessel 2 of the effluent material passing between separation means 6 and 7, vessel 2 is constructed with the aforementioned narrow portion 13. The narrow portion of the vessel reduces the volume within the vessel surrounding the separation means 6 which decreases the time required for hydrocarbon effluent material to flow from separation means 6 to separation means 7. By reducing the time it takes the effluent material passing between separation means 6 and 7 side reactions caused by the mixing of effluent from the riser reaction zone 1 and any catalyst which may be present in the upper portion of the vessel, are substantially reduced.

The riser reaction zone 1 is connected to the upper portion of vessel 2 through a bottom inlet 14'.

Reaction zone 1 contains an inlet portion at its bottom portion which receives freshly regenerated catalyst and feed stock which pass in admixture up through riser type reaction zone 1 and into separation means 6. The reaction zone 1 can vary in length depending on the operation taking place and the physical location of vessel 2 with respect to the riser inlet. A substantial portion of the riser reaction vessel 1 may be located within reaction vessel 2 when compared to the entire length of the riser reaction vessel 1. In some instances it may be desired to minimize the length of riser reaction zone 1 which sticks out of the bottom of vessel 2 in order to reduce heat losses. In other instances it is desired to promote long contacting times within the riser type reaction zone and a substantial portion of riser reaction zone 1 may be located outside of vessel 2.

As is known in the art, riser type reaction zones are designed with high length over diameter ratios. In the present case riser 1 should have that basic characteristic in order to induce concurrent fluidized flow of a fluid and catalyst particles. Riser 1 may vary in length from a few feet up to 100 or more feet with diameters of from a few inches up to about a few feet. Preferably, the riser is substantially straight and vertical. The riser is designed so that freshly regenerated catalyst and feed stock can be introduced at the lower portion of the riser and carried upward by the vaporized feed stock in an essentially dilute phase fluidized manner. Reaction vessel 1 may require internal support within vessel 2 in order to prevent its warping and to maintain a straight configuration when the vessel 2 is heated up to temperature.

Cyclone separators are familiar to those in the art of fluidized catalytic cracking and it is felt that a detailed explanation of their operation is not required. It is required that the cyclone be properly sized and used in the manner so that there is a separation of hydrocarbon and finely divided catalyst material. The cyclone separators may be used singularly or in a series or parallel arrangement.

The materials in the construction of all the components of this apparatus may comprise any known types of metals utilized in the petrochemical industry. Specifically, the stainless clad steel and the nickel chromium alloys may be utilized to withstand both high temperatures and the attrition presented by the catalyst rubbing against it certain portions of the apparatus. The entire apparatus may be insulated by any of the well known methods with heating elements, if required, attached to various portions of riser type reaction zone 1 and the reaction vessel 2. Not shown in the apparatus but of significance in performing the various processes which I described are the various flow control valves used to control the passage of freshly regenerated catalyst into the riser reaction zone or into the conduit 3 if desired and the fluid control means used to maintain given feed rates into and out of the process. Particularly valves can be located on the inlet portion of reactor riser 1, the conduit 3 and the outlet line 5 passing out of vessel 2. Similarly, control valves can be located on line 4 to control the amount of catalyst passed to the regeneration zone. The control and operation of the regenerator is well known to those versed in fluidized catalytic cracking or fluidized dehydrogenation art and is not deemed necessary to further explain the operations or characteristics of this zone.

A preferred embodiment of the process of this invention resides in utilizing a riser type reaction zone as depicted in attached drawing which passed into a contacting vessel at the bottom thereof. By utilizing this type of an arrangement the riser reaction zone and the contacting vessel can be integrated which can, in some instances, reduce heat losses from the riser reaction zone when a substantial portion of it is external to the vessel.

I claim:

1. An apparatus system for effecting a fluidized catalyst contacting in a riser in a manner precluding excess residence time within a contacting vessel of hydrocarbon affluent from said riser, which apparatus comprises in combination a vertically disposed contacting vessel adapted to retain a fluidized bed of catalyst particles, said vessel being reduced in cross-sectional area at the uppermost end portion thereof, a stream inlet means to said vessel for receiving a first charge stream, a catalyst outlet from said vessel, a first particle-fluid separation means located within said contacting vessel having an inlet means in communication within said contacting vessel, a hydrocarbon outlet means from said first particle separation means passing through said contacting vessel, a substantially vertical riser reaction column passing into and through said contacting vessel and said fluidized bed and having a lower inlet means for a hydrocarbon charge stream and catalyst particles, a substantial portion of said column being embedded in said fluidized bed, a second fluid-particle separation means located within said uppermost end portion of said contacting vessel and connected to an upper end portion of said riser, said second particle separation means having an outlet means which discharges into said contacting vessel at said uppermost end portion.

2. The apparatus of claim 1 further characterized in that stream inlet means is located at a lower portion of said reaction vessel.

3. The apparatus of claim 1 further characterized in that said catalyst outlet from said vessel is located at a lower portion of said vessel.

4. The apparatus of claim 1 further characterized in that said second particle separation means is located in a portion of said contacting vessel having a smaller inside cross-sectional area than the lower portion of the contacting vessel where said first separation means is located.

5. Claim 1 further characterized in that said stream inlet means comprises said riser reaction column.

6. Claim 1 further characterized in that said stream inlet into said contacting vessel is a conduit suitable for the passage of a hydrocarbon charge stream.

7. The apparatus of claim 1 further characterized in that said vertical riser reaction column passes into said reaction vessel at a lower portion thereof.

8. An apparatus system for effecting a fluidized catalyst contacting in a riser in a manner precluding excess residence time within a contacting vessel of hydrocarbon effluent from said riser, which apparatus comprises in combination a vertically disposed contacting vessel adapted to retain a fluidized bed of catalyst particles, a stream inlet means to said vessel for receiving a first charge stream, a catalyst outlet from said vessel, a first particle-fluid separation means located within said contacting vessel having an inlet means in communication within said contact vessel, a hydrocarbon outlet means from said first particle separation means passing through said contacting vessel, a vertical riser reaction zone passing into and through said contacting vessel and having a lower inlet means for a hydrocarbon charge stream and catalyst particles, a second fluid-particle separation means located within an upper end portion of said riser said second particle separation means having an outlet means which discharges into said contacting vessel.

* * * * *